Figure 1:
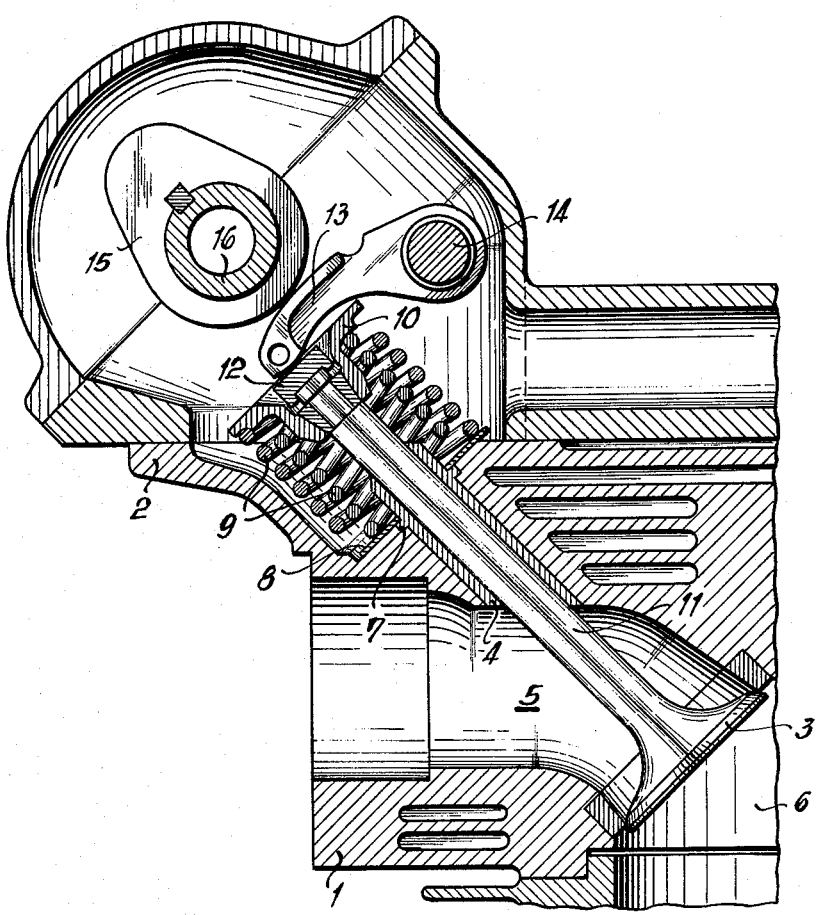

INVENTOR
Hans HOENICK

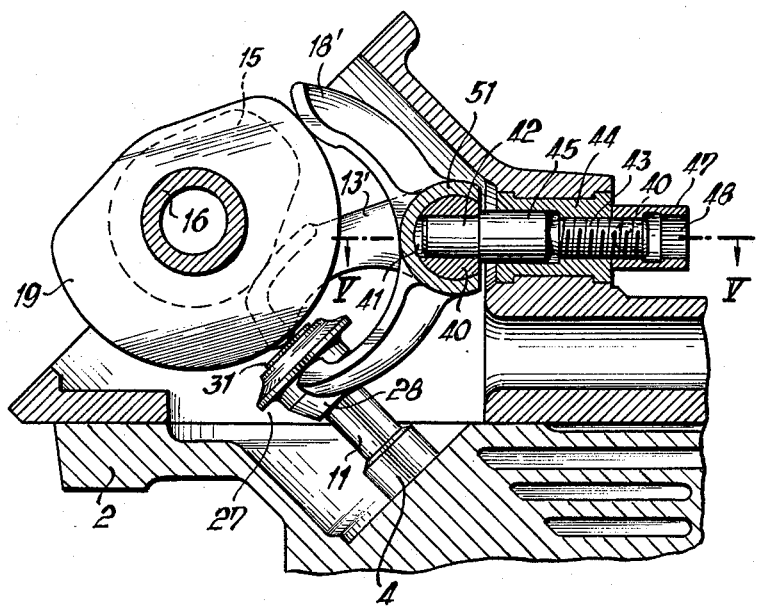

United States Patent Office 3,098,472
Patented July 23, 1963

3,098,472
VALVE CONTROL MECHANISM FOR INTERNAL COMBUSTION ENGINE
Hans H. Hoenick, Gerlingen, Wurttemberg, Germany, assignor to Firma Dr. Ing. h.c. F. Porsche K.G., Stuttgart-Zuffenhausen, Germany
Filed Oct. 24, 1960, Ser. No. 64,609
Claims priority, application Germany Nov. 26, 1959
9 Claims. (Cl. 123—90)

The present invention relates to a valve control mechanism for high-speed internal combustion engines in which the movements of the valve are effected by means of cam followers.

Valve control mechanisms of internal combustion engines are known in the prior art in which the movements of the valve are realized positively by means of cam disks, possibly levers. In one of the prior art constructions, a cam disk or cam plate is arranged adjacent the cam which actuates directly the valve whereby the cam disk acts on the valve through rigid bell cranks or angle levers. As a result of the ensuing change in the direction of the forces, there arise moments which have to be absorbed by correspondingly constructed bearing bushings. A relatively stable construction and the use of special materials are also required for such an arrangement. The relatively long guide means necessitated by the moments increase the size and dimensions of the internal combustion engine. Because of the direct action of the cam on the valve, special arrangements are also required in connection therewith. For example, a cap to be placed on the valve shaft is necessitated which is constructed of corresponding strength and consists of special alloys. However, the weight of the movable parts and therewith the masses to be actuated are increased thereby. Additionally, relatively long valve guides are necessary which have to absorb the lateral forces coming from the cam.

These disadvantages are eliminated by the present invention by achieving the opening movement of the valve by means of a drag lever cooperating with the cam and by realizing the closure movement thereof by means of two-armed levers mounted on both sides of the drag lever which engage with the valve and cooperate with cam disks arranged coaxially to the cam. By the provision of a drag lever, a transmission is interposed between the cam and the valve whereby a more favorable cam shape with smaller dimensions is achieved. Neither relatively expensive caps nor valve guides are necessary in connection with a construction according to the present invention. In addition to this feature, two levers are provided as return parts for the valve. By reason of the position and location of the two levers directly adjacent to and on both sides of the drag lever without the interposition of a bushing necessary with bell cranks or angle levers, there exists no possibility for the occurrence of any moments. As a result thereof, the constructional realization of the levers is more simple and more light-weight. The cam disks necessary therefor are also located on both sides of the cam shaft. The drag lever and the two-armed levers are mounted freely rotatably on shafts arranged essentially coaxially with respect to each other. Consequently, the support and mounting of the levers takes place to one side of the valve whereby a space saving construction results therefrom. Advantageously, all of the levers are mounted on a common shaft. However, it is also possible to guide each lever on a separate or independent shaft supported within the internal combustion engine whereby the individual shafts coordinated to the levers are adjustable. As a result thereof, manufacturing inaccuracies as well as the adjustment of the valve play may be compensated for or adjusted for each individual lever.

Internal combustion engines with positively controlled valves are known to be more expensive in manufacture thereof than those with spring-loaded valves as the former are normally considered only for special purposes, for example, for the installation in sports cars or racing cars. A particularly high cost factor thereby forms the small series or small numerical production of structural parts used in the known constructions such as especially of the cylinder head which, with the aforementioned positive control mechanisms, has to have a different configuration and construction for the accommodation, for example, of the relatively large mechanisms described hereinabove.

In order to save the additional cost connected with molds, machining installations, etc., and to enable corresponding savings in cost, the control of the valves according to the present invention has been realized in such a manner that the opening movement of the valve takes place by the drag lever and the cam whereas the closure movement of the valve takes place selectively by the provision of either a spring surrounding the valve and abutting thereagainst when utilized in a conventional speed engine, or one or several bell cranks or angle levers preferably arranged on the bearing pivot of the drag lever which cooperate with cam disks arranged coaxially to the cam when utilized in a high speed engine such as a racing car.

By the use of such an arrangement in accordance with the present invention, the expenditures and outlays for an internal combustion engine having positively controlled valves is reduced to relatively few additional structural parts. These parts essentially consist of two cam disks as well as the corresponding two-armed levers. Furthermore, by reason of the advantageous construction of the valve mechanism according to the present invention, the same cylinder head may be used for both types of control mechanisms.

Accordingly, it is an object of the present invention to provide a valve control mechanism for internal combustion engines which avoids the shortcomings and drawbacks encountered with the prior art constructions.

It is a still further object of the present invention to provide a valve control mechanism for internal combustion engines in which changes in the direction of the transmission of forces are minimized to thereby reduce the moments resulting therefrom and thereby simplify the overall construction.

Still another object of the present invention resides in the provision of a valve control mechanism for internal combustion engines in which the necessity for a sturdy construction and use of special materials is obviated by the reduction or elimination of the production of moments within the movable parts thereof to thereby also simplify the manufacture and reduce the cost of the control mechanism.

Still another object of the present invention resides in the provision of a valve control mechanism which may in the provision of a valve control mechanism which may be readily converted from a control mechanism in which the return movement of the valve is controlled by a compression spring to a positive valve control mechanism without the necessity of an unduly large number of special parts produced in small series.

A further object of the present invention resides in the provision of a valve control mechanism for internal combustion engines in which a large number of the standardized parts, particularly the cylinder head and those parts requiring casting and machining are usable for the two types of control mechanisms, namely for one, in which the return movement of the valve is obtained by means of a spring and for one in which the return movement of the valve is obtained by a positive control.

Figure 2:
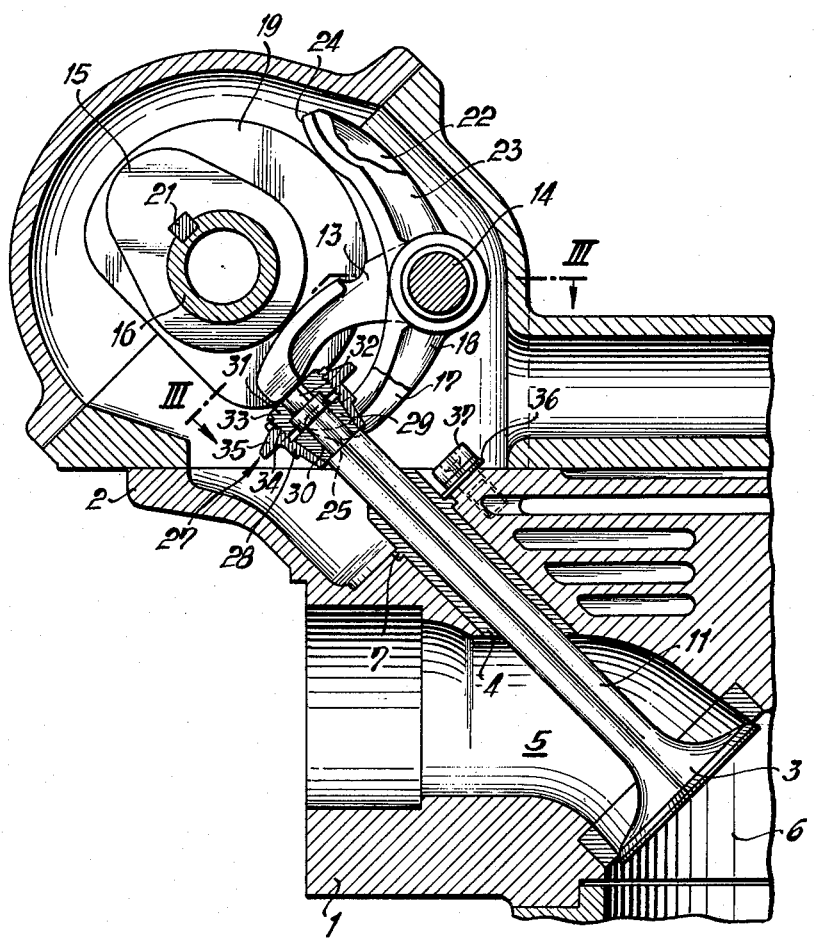
Figure 3:
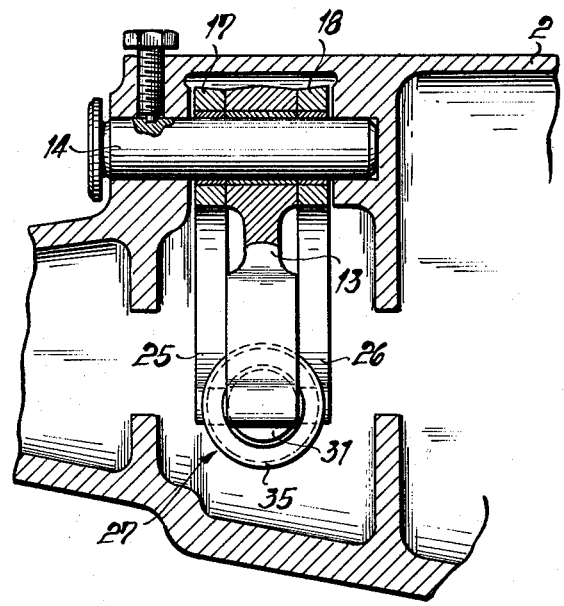
Figure 5:
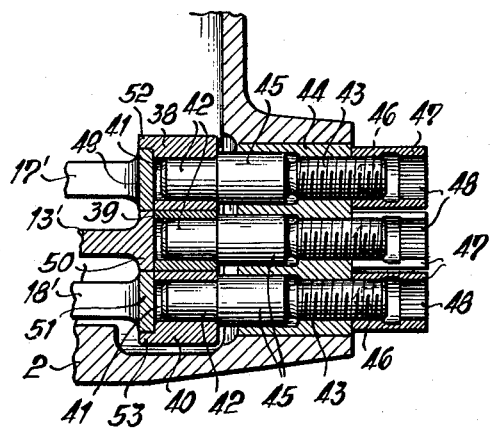

These and other objects, features and advantages of the present invention will become more obvious from the following description when taken in connection with the accompanying drawing which shows, for purposes of illustration only, several embodiments in accordance with the present invention and wherein FIGURE 1 is a cross-sectional view through a cylinder head of an internal combustion engine with a spring-loaded valve which is actuated by a cam and drag lever, FIGURE 2 is a cross-sectional view through a cylinder head of an internal combustion engine, similar to FIGURE 1, in which a control mechanism according to the present invention is used in place of the valve spring, FIGURE 3 is a cross-sectional view taken along line III—III of FIGURE 2, in which the cam disks as well as the cam are omitted for clarity's sake, FIGURE 4 is a partial cross-sectional view through the cylinder head of an internal combustion engine according to the present invention provided with a modified construction of an adjustable bearing support of the levers acting on the valve, and FIGURE 5 is a cross-sectional view taken along line V—V of FIGURE 4.

Referring now to the drawing wherein like reference numerals are used throughout the various views to designate like parts, and more particularly to FIGURE 1, reference numeral 1 designates therein an internal combustion engine which is provided with a cylinder head 2 in which are accommodated the parts for the gas exchange. These parts essentially consist of valve 3 which is slidingly guided in a valve guide 4 located within the cylinder head 2 and closes off a gas duct or channel 5 with respect to the combustion space 6 of the internal combustion engine. The valve guide 4 is provided with a flange 7 which is mounted within a recess of the cylinder head 2 and is covered by a disk 8. Valve springs 9 abut against the disk 8 and act on the valve 3 through a spring disk 10 mounted on the shaft 11 of the valve 3. Furthermore, a sliding member 12 is arranged at the valve shaft 11 which cooperates with a drag lever 13. The drag lever 13 is arranged on a pivot pin or bearing shaft 14 supported within the cylinder head 2 and is under the influence of a cam 15. The cam 15 is non-rotatably secured on a shaft 16 which is driven in any known manner by the internal combustion engine. Upon rotation of the cam 15, the valve 3 is adjusted in the axial direction thereof as is well known.

In order to convert this internal combustion engine of more or less conventional construction into a high performance internal combustion engine, a positive guidance of the valves is installed in accordance with the present invention in the place of the valve spring 9, however, without any change in the cylinder head 2. For that purpose (FIGURES 2 and 3), two two-armed levers 17 and 18 are freely rotatably arranged on the shaft 14 at opposite sides of the drag lever 13. Similarly, two cam disks are secured to the shaft 16 carrying the cam 15 of which one cam disk 19 is coordinated to the lever 17 and the other cam disk (not shown in the drawing) is coordinated to the other lever 18. The mounting of the cam disks takes place thereby in any suitable manner, for example, by means of a spline connection 21 or the like by means of which the cam and cam disk are preferably secured together on the shaft 16. Levers 17, 18 include arms 22, 25 and arms 23, 26, respectively. Each arm 22 and 23 is provided with a working surface 24 which slides along a respective cam disk coordinated to the corresponding lever. The other arms 25 and 26 of the levers 17 and 18 act directly on the valve 3. For that purpose, the valve or the valve shaft 11 of the valve is provided, in the place of the relatively large spring disk 10, with a dish-shaped member 27 of smaller dimension as the connecting part between the valve 3 and the actuating arms 25 and 26. The dish-shaped member 27 is mounted on the valve 3 or valve shaft 11 by means of wedge-shaped semi-circular rings 28 and 29 which are mounted in an annular groove 30 of the valve shaft 11. For purposes of holding the dish-shaped member 27 in position thereof, a cap 31 is provided. The cap 31 is thereby provided with a hexagonal aperture 32 and includes a thread 33 so that it may be threadably inserted into a corresponding aperture 34 of the dish-shaped member 27 provided with the complementary threads. The cap 31 thereby serves simultaneously as working surface for the drag lever 13. The dish-shaped member 27 is provided with a circumferential flange 35 whereby the arms 25 and 26 of the levers 17 and 18, respectively, act thereagainst from the underside thereof.

Finally, instead of the disk 8 of FIGURE 1, by means of which the valve guide 4 or the flange 7 thereof is retained in position, a ring 36 is provided in FIGURES 2 and 3 which is retained at the cylinder head by means of a screw 37.

The drive of the valve control mechanism thereby takes place, for example, by means of a king pin of known construction which engages with a gear wheel non-rotatably connected with the shaft 16. Since these parts are of conventional construction they are not shown in the drawing.

A positive guidance of such construction is simple and entails a constantly aimed-for reduction of the masses to be moved whereby the stresses and loads in the control parts are smaller.

A mounting of the levers different from that of the embodiment of FIGURES 1 to 3 is illustrated in FIGURES 4 and 5. With a construction of the control arrangement which is otherwise similar in principle, the drag lever 13' as well as both doubled-armed levers 17' and 18' are individually mounted on short shaft stubs 38, 39 and 40, respectively. Each of these shafts 38, 39 and 40 is provided with a bore 41. Each bore 41 receives a respective pin 42. Each pin 42 is arranged at the threaded bolt member 43 which is mounted within an insert member 44 rigidly connected with the cylinder head 2. The threaded bolt member 43 is provided with a collar portion 45 against which abut the shafts which are guided otherwise in a loose manner on the pin 42. Additionally, an internal hexagonal aperture 46 is provided within each bolt member 43. A counter-nut 47 is also arranged at each threaded bolt member 43 which nut 47 is provided with an internal toothed configuration 48 into which a correspondingly constructed key may be inserted for adjusting the nut 47.

The levers 13', 17' and 18' are supported at the shafts 38, 39 and 40, respectively in a freely pivotal manner by means of hub portions 49, 50 and 51 thereof. The outer shafts 38 and 40 (FIGURE 5) are provided for purposes of guiding the hub portions with projecting collar portions 52 and 53 which retain the hub portions axially in the respective positions thereof.

It is possible by such an arrangement to adjust individually and accurately the levers independently of one another, either to compensate for manufacturing inaccuracies or to adjust the valve play. For that purpose, the nut 47 is loosened, and the threaded bolt member 43 is rotated by means of a key inserted into the internal hexagonal aperture 46. As a result thereof, the corresponding shaft is adjusted radially. The threaded bolt member 43 is thereupon secured by tightening the nut 47.

While I have shown and described several embodiments in accordance with the present invention, it is understood that the same is not limited thereto but is susceptible of many changes and modifications within the spirit and scope of the present invention, and I, therefore, do not wish to be limited to the details shown and described herein but intend to cover all such changes and modifications as are encompassed by the scope of the appended claims.

I claim:

1. A positive action valve control mechanism for high speed internal combustion engines in which the movements of the valve is effected by means of cam followers, comprising valve means, means for producing the opening movement of said valve means including cam means and drag lever means operatively connected between said cam means and said valve means, and solid means for positively and unyieldingly effecting the entire closure movement of said valve means including two-armed lever means located on both sides of said drag lever means, said two-armed lever means acting on said valve means, and cam disk means mounted coaxially with said cam means and cooperating with said two-armed lever means.

2. A valve control mechanism according to claim 1, wherein said drag lever means and said two-armed lever means are supported in a freely rotatably manner essentially coaxially with respect to each other.

3. A valve control mechanism according to claim 1, wherein all of said lever means are mounted on a common shaft.

4. A valve control mechanism according to claim 3, wherein said lever means are mounted on said common shaft in a freely rotatable manner.

5. A valve control mechanism for high-speed internal combustion engines in which the movements of the valve is effected by means of cam followers, comprising valve means, means for producing the opening movement of said valve means including cam means and drag lever means cooperating with said cam means, and solid means for positively and unyieldingly effecting the entire closure movement of said valve means including two-armed lever means located on each side of said drag lever means.

6. A valve control mechanism adapted to be selectively used with high speed internal combustion engines in which at least the opening movement of the valve is effected by means of a cam follower, comprising valve means, means for producing the opening movement of said valve means including cam means and drag lever means operatively connected between said cam means and said valve means, and solid lever means for positively and unyieldingly effecting the final closure movement of said valve means.

7. In an internal combustion engine having cylinder head casings of a size and configuration found in conventional speed internal combustion engines, valve means, and a high speed valve control mechanism operatively connected within said cylinder head casings, said valve control mechanism comprising means for producing an opening movement of said valve means including cam means and drag lever means operatively connected between said cam means and said valve means, and solid means for positively and unyieldingly effecting a closure movement of said valve means including two-armed lever means located on both sides of said drag lever means and cam disk means cooperating with said two-armed lever means to effect the positive closure of said valve means.

8. A positive action valve control mechanism for high speed internal combustion engines in which the movement of the valve is effected by means of cam followers, comprising valve means, means for producing an opening movement of said valve means including cam means and drag lever means operatively connected between said cam means and said valve means, and solid means for positively and unyieldingly effecting a final closure movement of said valve means, said last-mentioned means including cam disc means operatively connected to said cam means, two-armed lever means located on both sides of said drag lever means, said two-armed lever means including first arm means directly engaging said cam disc means and second arm means acting upon said valve means, and pivot axis means for supporting thereon said drag lever means and said two-armed lever means essentially coaxially with respect to each other.

9. A valve control mechanism for high speed internal combustion engines according to claim 5, wherein said two-armed lever means is comprised by a pair of two-armed levers.

References Cited in the file of this patent

UNITED STATES PATENTS

| | | |
|---|---|---|
| 1,164,183 | Herkt | Dec. 14, 1915 |
| 1,227,812 | MacPherson | May 29, 1917 |
| 1,633,882 | Ballot | June 28, 1927 |
| 1,644,059 | Holle | Oct. 4, 1927 |
| 2,015,135 | Brady | Sept. 24, 1935 |
| 2,751,895 | Gassman | June 26, 1956 |
| 2,814,283 | Gassman et al. | Nov. 26, 1957 |
| 2,831,470 | Lorcheidt | Apr. 22, 1958 |

FOREIGN PATENTS

| | | |
|---|---|---|
| 590,149 | France | Mar. 11, 1925 |
| 701,697 | France | Jan. 12, 1931 |
| 551,730 | Germany | Nov. 23, 1956 |
| 548,413 | Italy | Sept. 25, 1956 |